(12) United States Patent
Nishira et al.

(10) Patent No.: US 7,729,840 B2
(45) Date of Patent: Jun. 1, 2010

(54) VEHICLE BRAKE CONTROL SYSTEM AND METHOD

(75) Inventors: Hikaru Nishira, Yokohama (JP); Yoshitaka Deguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 249 days.

(21) Appl. No.: 11/754,605

(22) Filed: May 29, 2007

(65) Prior Publication Data
US 2007/0294019 A1    Dec. 20, 2007

(30) Foreign Application Priority Data
Jun. 16, 2006  (JP) .............................. 2006-167397
Mar. 13, 2007  (JP) .............................. 2007-063557

(51) Int. Cl.
G06F 19/00      (2006.01)

(52) U.S. Cl. ......................... 701/70; 701/300; 701/301

(58) Field of Classification Search ................... 701/41, 701/70, 96, 301
See application file for complete search history.

(56) References Cited

U.S. PATENT DOCUMENTS

2004/0088097 A1* 5/2004 Fujinami et al. .............. 701/70
2005/0090938 A1* 4/2005 Ranelli .......................... 701/1
2005/0125153 A1* 6/2005 Matsumoto et al. ......... 701/300
2005/0267683 A1* 12/2005 Fujiwara et al. ............. 701/301

FOREIGN PATENT DOCUMENTS

JP      2004-155241       6/2004

* cited by examiner

*Primary Examiner*—Mark Hellner
*Assistant Examiner*—Helal A Algahaim
(74) *Attorney, Agent, or Firm*—Global IP Counselors, LLP

(57) ABSTRACT

A vehicle brake control system is provided with a preceding object detecting section, a running condition detection section, a steering actuation state detecting section, a braking force detecting section, a preceding object avoidability determining section and a braking force control section. The preceding object avoidability determining section determines a possibility of avoiding the preceding object by steering and reducing the current braking force acting on the host vehicle based on the position of the preceding object, the running condition of the host vehicle, the braking force applied to the host vehicle and the steering wheel actuation state that are detected. The braking force control section reduces the current braking force applied by the host vehicle braking system when the preceding object avoidability determining section determines that the preceding object can be avoided by steering and reducing the current braking force acting on the host vehicle.

16 Claims, 13 Drawing Sheets

VEHICLE BRAKE CONTROL SYSTEM AND METHOD

CROSS-REFERENCE TO RELATED APPLICATIONS

This application claims priority to Japanese Patent Application No. 2006-167397, filed on Jun. 16, 2006. The entire disclosure of Japanese Patent Application No. 2006-167397 is hereby incorporated herein by reference.

BACKGROUND OF THE INVENTION

1. Field of the Invention

The present invention generally relates to a vehicle brake control system and method capable of assisting a driver with respect to avoiding an obstacle. More specifically, the present invention relates to a vehicle brake control system and method that aids in determining if a preceding detected obstacle can be avoided by steering way from the preceding object and lowering the braking force acting on the vehicle.

2. Background Information

Vehicle brake control systems have been proposed to determine the possibility of avoiding an obstacle existing in front of a host vehicle in which the system is employed and to control a host vehicle braking system applied to the host vehicle so as to avoid a collision. One example of such a vehicle brake control system is disclosed in Japanese Laid-Open Patent Publication No. 2004-155241. In this publication, it is also proposed that when the driver is operating the steering wheel, a generated braking force is reduced compared to the braking force that would be generated if the driver were not operating the steering wheel.

SUMMARY OF THE INVENTION

Since the vehicle brake control system just described does not determine whether or not the vehicle can avoid the preceding object by steering with the braking force of the vehicle being lowered, there are situations in which the reduced braking force control may be executed even though the obstacle cannot be avoided by steering with the reduced braking force control being executed. Thus, the avoidance control provided by this vehicle brake control system may not be optimal in certain situations.

The present invention was conceived in view of this disadvantage in the above mentioned vehicle brake control system. One object of the present invention is to improve the accuracy with a vehicle brake control system can determine that a detected preceding object can be avoided by steering away from the preceding object with a reduced braking force acting on the vehicle in situations in which it is difficult to avoid the preceding object with a braking force alone.

In order to achieve the aforementioned object, the present invention is configured to determine if it is possible to avoid an obstacle by steering and reducing the braking force currently acting on the vehicle. In particular, the above mentioned object can basically be attained by providing a vehicle brake control system that comprises a preceding object detecting section, a running condition detection section, a steering actuation state detecting section, a braking force detecting section, a preceding object avoidability determining section and a braking force control section. The preceding object detecting section is configured to detect a position of a preceding object existing in front of a host vehicle. The running condition detection section is configured to detect a running condition of the host vehicle. The steering actuation state detecting section is configured to detect an actuation state of a steering wheel of the host vehicle. The braking force detecting section is configured to detect a current braking force applied to the host vehicle by a host vehicle braking system. The preceding object avoidability determining section is configured to determine a possibility of avoiding the preceding object by steering and reducing the current braking force acting on the host vehicle based on the position of the preceding object, the running condition of the host vehicle, the braking force applied to the host vehicle and the steering wheel actuation state that are detected. The braking force control section is configured to reduce the current braking force applied by the host vehicle braking system when the preceding object avoidability determining section determines that the preceding object can be avoided by steering and reducing the current braking force acting on the host vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
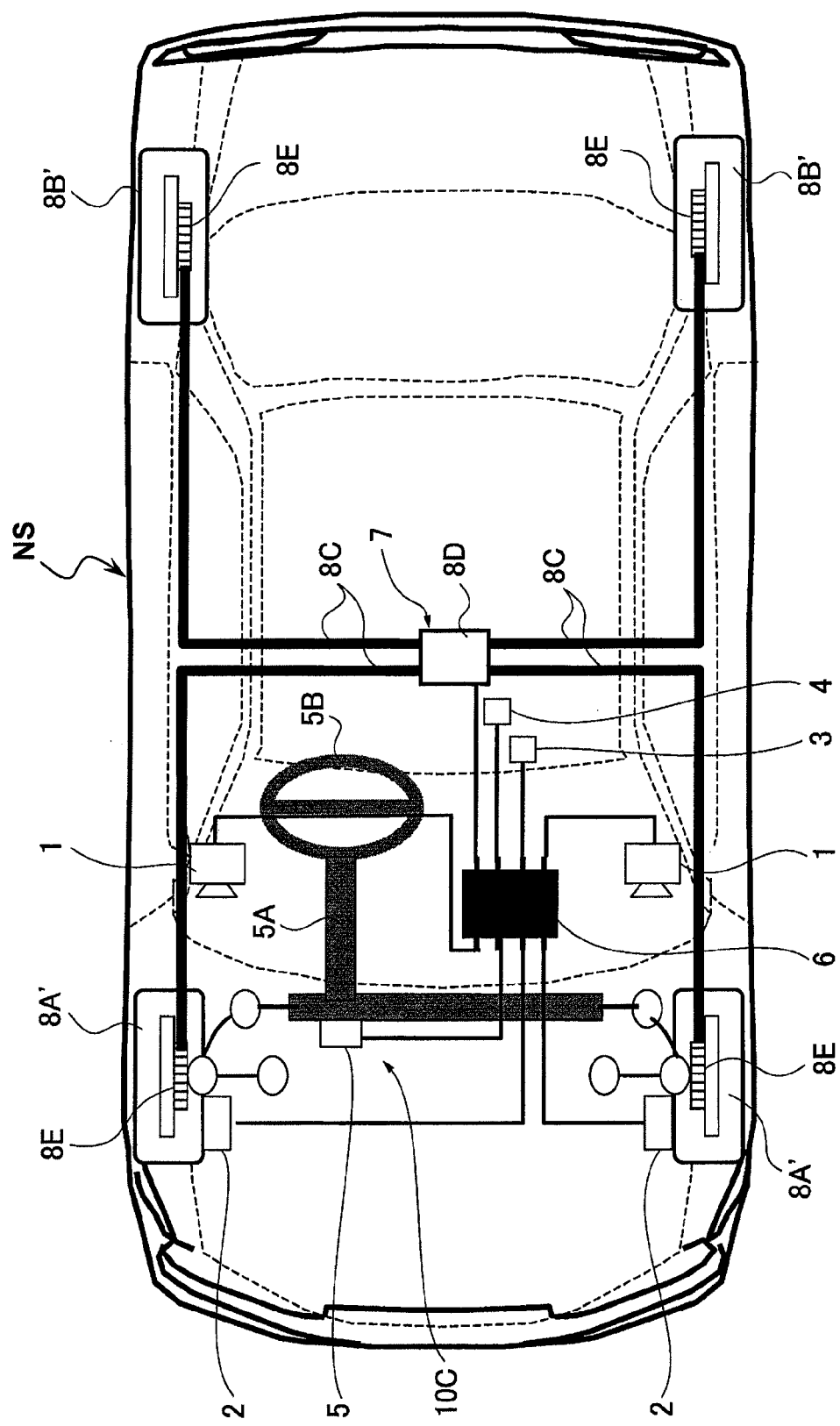
FIG. 1 is a vehicle is schematically illustrated with a vehicle brake control system in accordance with a first embodiment of the present invention.

Referring initially to FIG. 1, a vehicle NS (hereinafter also called "the host vehicle") is illustrated that is equipped with a vehicle brake control system in accordance with a first embodiment of the present invention. As shown in FIG. 1, the vehicle brake control system basically includes a pair of cameras 1, a pair of vehicle speed sensors 2, a yaw rate sensor 3, an acceleration sensor 4, a steering angle sensor 5, a control unit 6, a host vehicle braking system 7, a pair of front wheels 8A', and a pair of rear wheels 8B'. The front and rear wheels 8A' and 8B' as used herein includes their respective tires. These constituent components are arranged in appropriate locations of the host vehicle NS to carry out the present invention, as will now be explained.

Figure 4:
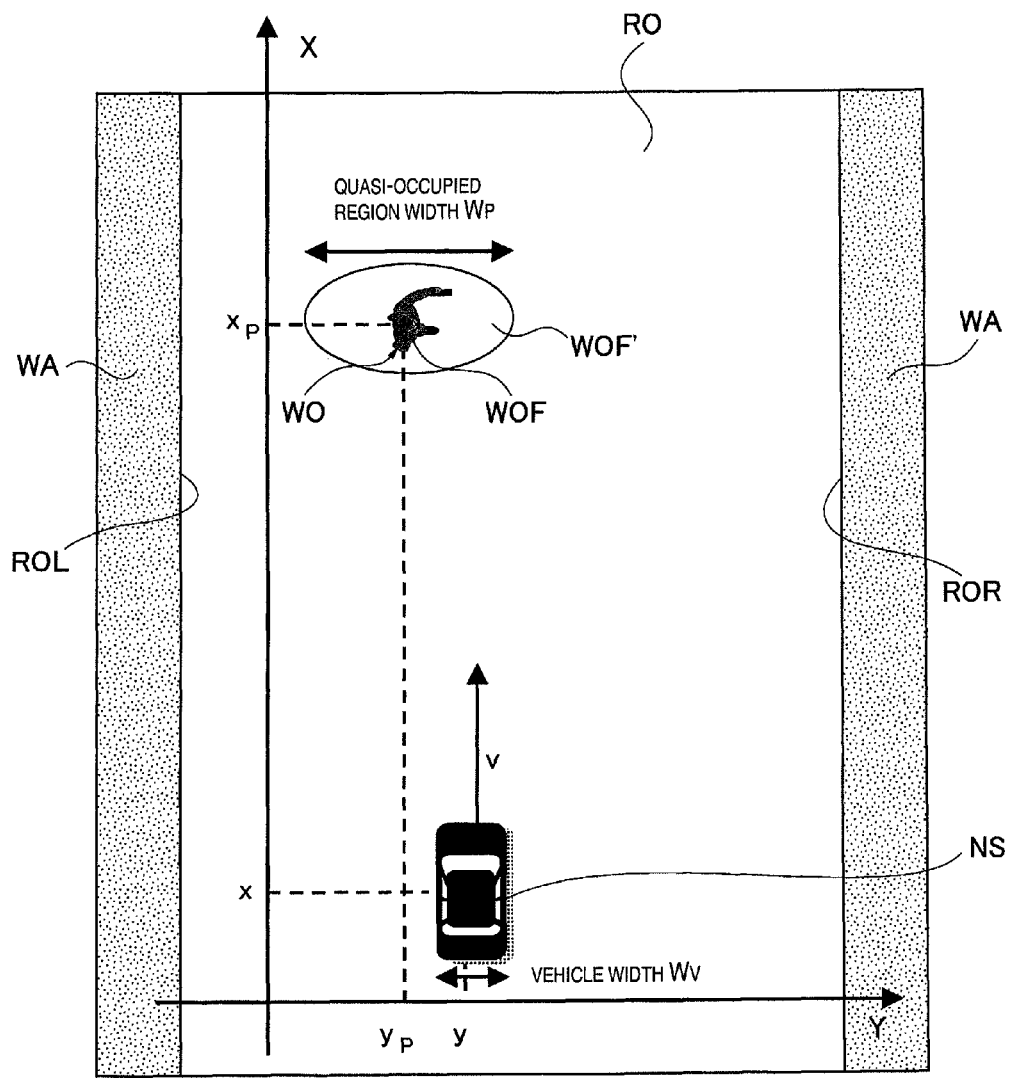
FIG. 4 is a schematic diagram illustrating the establishment of a coordinate system for defining the state quantities of the host vehicle shown in FIG. 1.

The cameras 1 are mounted inside a frontward portion of the cabin such that they can photograph the road situation in front of the host vehicle NS. The cameras 1 function as a preceding object detecting section 10A (see FIG. 2) that are configured to detect such features as a preceding object or obstacle WO, road boundaries ROL and ROR, white lines, etc., on the road in front of the host vehicle NS. FIG. 4 illustrates features detected by the preceding object detecting section 10A. In this embodiment, the preceding object detecting section 10A includes the two cameras 1 that are laterally spaced apart in a widthwise (lateral) direction of the host vehicle NS such that it can detect the direction and distance of the preceding object WO. Thus, the preceding object detecting section 10A processes the images captured by the cameras 1 and detects the relative position of the preceding object WO with respect to the host vehicle NS.

In this embodiment, each of the vehicle speed sensor 2 uses a rotary encoder mounted to a portion (not shown) of one of the wheels 8A' of the host vehicle. As the wheel rotates, the rotary encoder generates a pulse signal proportional to the rotational speed of the wheel. The vehicle speed sensors 2 detect the pulse signal and thereby measure the vehicle speed when the wheels are not being braked.

The yaw rate sensor 3 is a well-known device employing a quartz transducer or semiconductor device. The yaw rate sensor 3 is preferably mounted to a middle portion of the host vehicle NS. The yaw rate sensor 3 detects the yaw rate of the host vehicle NS.

The acceleration sensor 4 is a well-known device employing a piezoelectric element or other technology. The acceleration sensor 4 is arranged in an appropriate location. The acceleration sensor 4 serves to detect the acceleration rate of the host vehicle NS. In this embodiment, the accelerator sensor 4 is used to estimate the speed of the host vehicle NS during braking.

Figure 2:
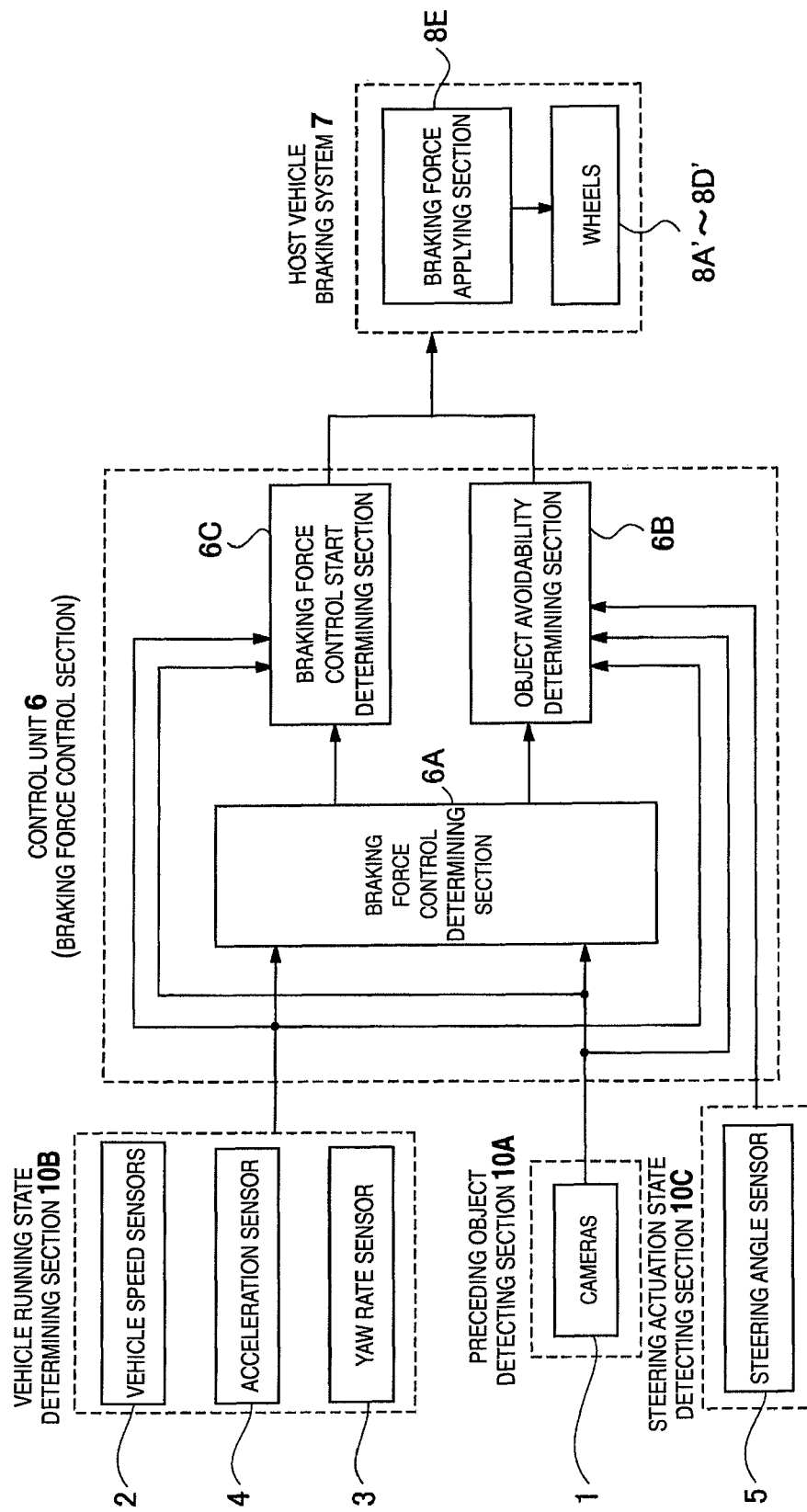
FIG. 2 is a block diagram of the vehicle brake control system shown in FIG. 1 for explaining the functional relationships of the components of the vehicle brake control system in accordance with a first embodiment of the present invention.

As indicated in FIG. 2, the vehicle speed sensors 2, the yaw rate sensor 3, and the acceleration sensor 4 function as a running condition detection section 10B for detecting the running condition of the host vehicle NS. When the host vehicle NS is not being braked, the running condition detection section 10B uses the measurement value of the vehicle speed sensors 2 to detect the running speed of the host vehicle NS. Meanwhile, when the host vehicle NS is being braked, the running condition detection section 10B detects the running speed of the host vehicle NS by applying an integration calculation to measurement values from the acceleration sensor 4.

The steering angle sensor 5 in the illustrated embodiment is part of a rack and pinion steering mechanism that includes a steering shaft 5A with a steering wheel 5B mounted thereto. By detecting the rack stroke amount resulting from operation of the steering shaft 5A, the steering angle sensor 5 measures the angle to which the steering wheel 5B is being turned by the driver. As indicated in FIG. 2, the steering angle sensor 5 functions as a steering actuation state detecting section 10C that is configured to detect operation of the steering wheel 5B by the driver. In this embodiment, the steering actuation state detecting section 10C is configured to detect the steering actuation amount (amount by which the steering wheel is turned by the driver), which can be assumed to be substantially equal to the steering angle of the front wheels 8A'.

The control unit 6 preferably includes a microcomputer with a vehicle brake control program that controls the braking of the vehicle 10 as discussed below. The control unit 6 is arranged in an appropriate location and comprises integrated circuits including such components as a microprocessor, an A/D converter circuit, a D/A converter circuit, a central processing unit and storage devices such as a ROM (Read Only Memory) device and a RAM (Random Access Memory) device. The control unit 6 is capable of selectively controlling any of the components of the control system in accordance with the control program. The control unit 6 executes computer processing in accordance with a program stored in the memory so as to process detection signals from the sensors 2 to 5 and to calculate a braking force command value for obstacle avoidance. The control unit 6 sends the resulting braking force command value to the host vehicle braking system 7. It will be apparent to those skilled in the art from this disclosure that the precise structure and algorithms for the control unit 6 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The host vehicle braking system 7 comprises, for example, a braking force applying section 8E comprising front wheel brakes and rear wheel brakes, a brake hydraulic system 8C configured to control the front brakes and rear brakes with hydraulic pressure, and a control valve 8D provided in the hydraulic system 8C. The opening degree, for example, of the control valve 8D is adjusted in accordance with the braking force command signal from the control unit 6.

The control unit 6 functions as a braking force control section that includes a braking force control determining section 6A, an object avoidability determining section 6B, and a braking force control start determining section 6C. The braking force control determining section 6A, the preceding object avoidability determining section 6B and the braking force control start determining section 6C are preferably part of, for example, a software module. As will be explained below in more detail, the object avoidability determining section 6B determines if it is possible to avoid a preceding object by steering and reducing the braking force currently acting on the host vehicle. The braking force control determining section 6A determines if a braking force control is in progress, which is sent to the braking force control start determining section 6C for controlling the host vehicle braking system 7 based on the determination of the preceding object avoidability determining section 6B. As a result, the determination accuracy can be improved when it is determined that the preceding object can be avoided by steering (i.e., when the steering wheel is being turned) away from the preceding object and reducing the braking force (i.e., when the steering wheel is being turned).

The braking force control determining section 6A serves to determine whether or not braking force control is in progress (i.e., is being executed). When the braking force control determining section 6A has determined that braking force control is in progress, the preceding object avoidability determining section 6B serves to determine whether or not the preceding object WO can be avoided if the braking force currently acting on the host vehicle NS is lowered. The determination of avoidability is made based on the position of the preceding object WO relative to the host vehicle NS detected by the preceding object detecting section 10A, the host vehicle running condition detected by the running condition detection section 10B, and the actuation state detected by the steering actuation state detecting section 10C. If it determines that the preceding object WO can be avoided by steering and reducing the current braking force, the preceding object avoidability determining section 6B controls the host vehicle braking system 7 so as to lower the braking force applied to the host vehicle NS.

The braking force control start determining section 6C serves to determine whether or not it is impossible to avoid the preceding object WO based on the position of the preceding object WO relative to the host vehicle NS detected by the preceding object detecting section 10A and the host vehicle running condition detected by the running condition detection section 10B. If the braking force control start determining section 6C determines that the preceding object WO is unavoidable, then the braking force control start determining section 6C starts the execution of a braking force control. The control unit 6 and the host vehicle braking system 7 are also preferably provided with the functional capability to execute a typical ABS control. Here, the term "ABS control" refers to a control configured to monitor the slippage state of each of the wheels based on the change in the rotational speed of each wheel and to lower the braking force acting on any of the wheels when it is determined that the slippage state of that wheel exceeds a prescribed level. By lowering the braking force of each wheel as required, the slippage states of the wheels are held to or below the prescribed level and the ability of the wheels to support lateral loads is maintained.

Figure 3:
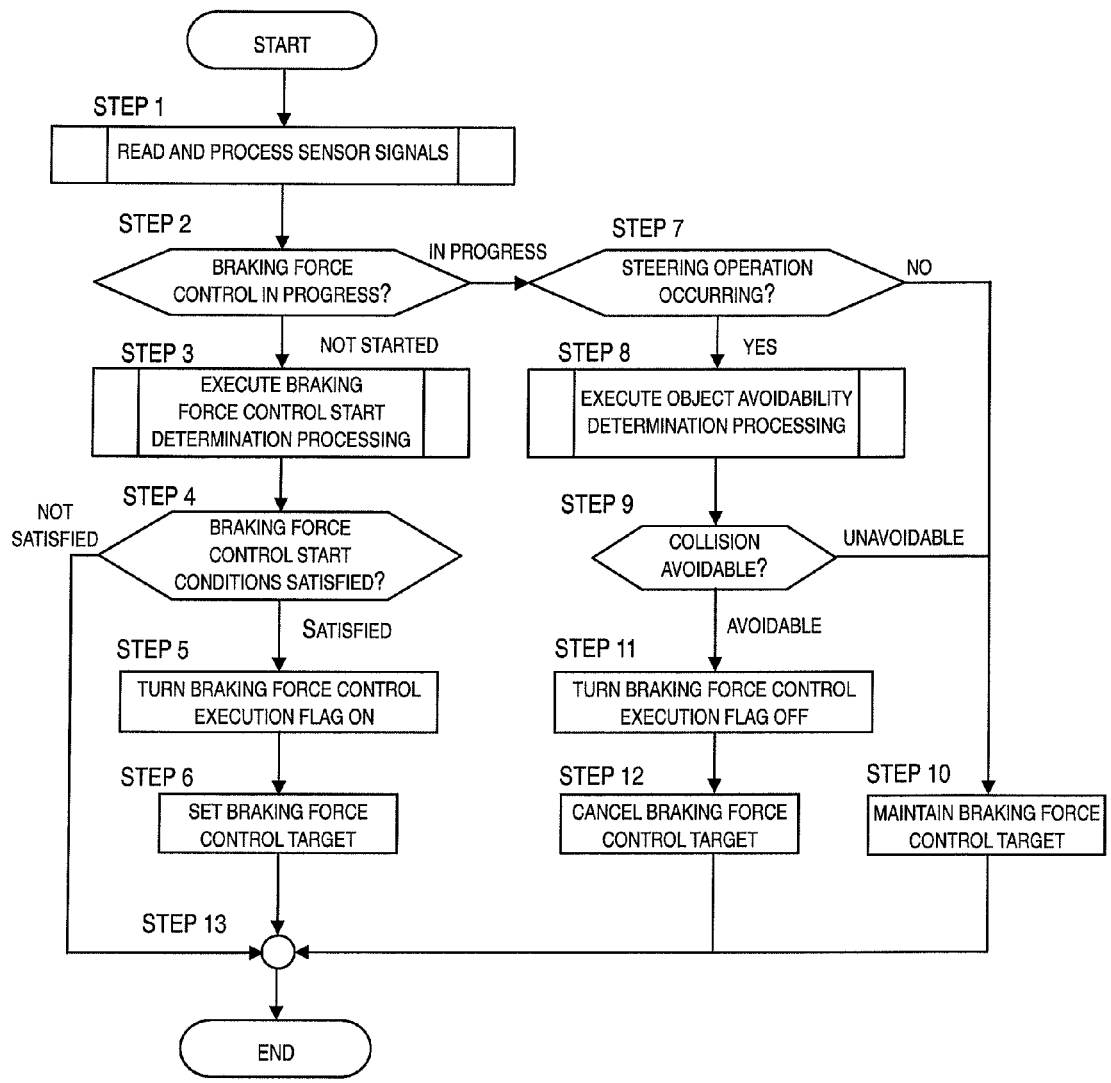
FIG. 3 is a flowchart showing the control processing steps executed in the vehicle brake control system shown in FIG. 1 for explaining the operation of the vehicle brake control system.
Figure 5:
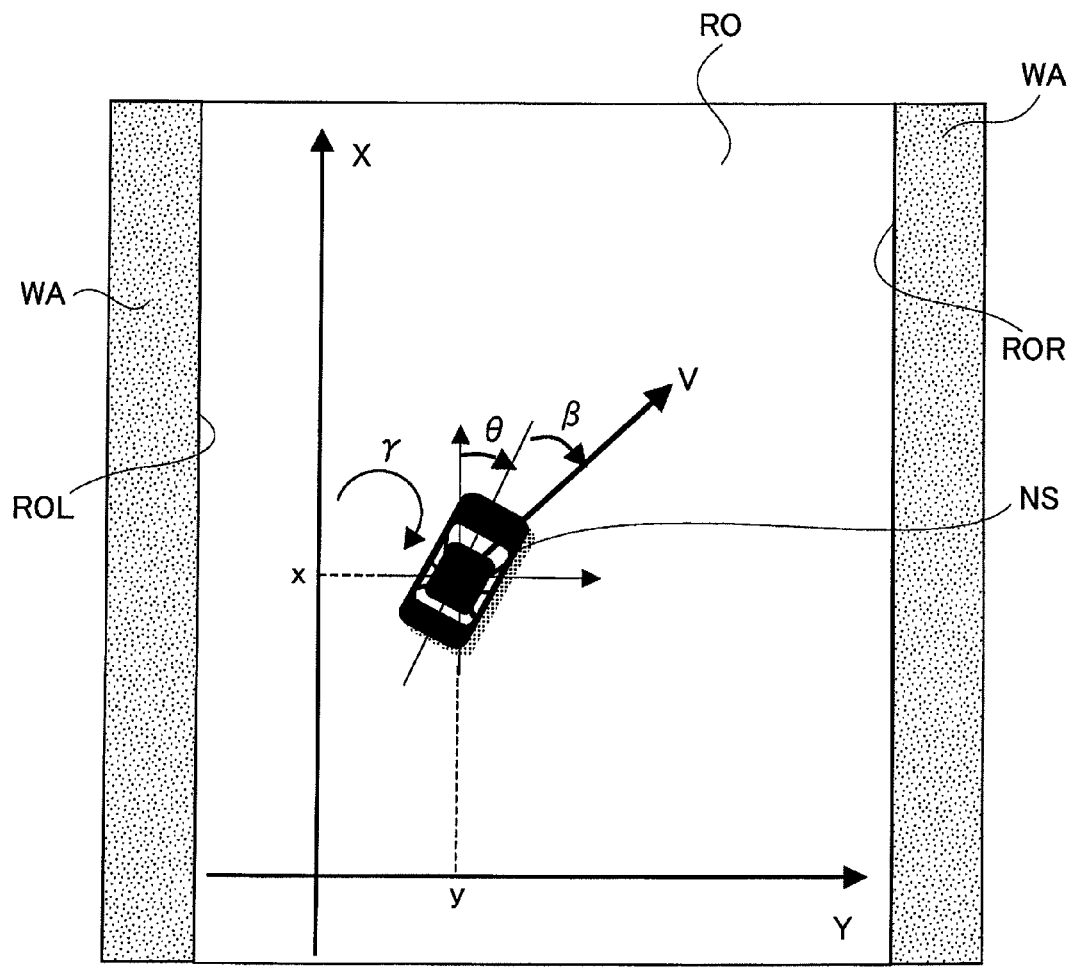
FIG. 5 is a schematic diagram illustrating the state quantities used to estimate the host vehicle travel path.
Figure 6:
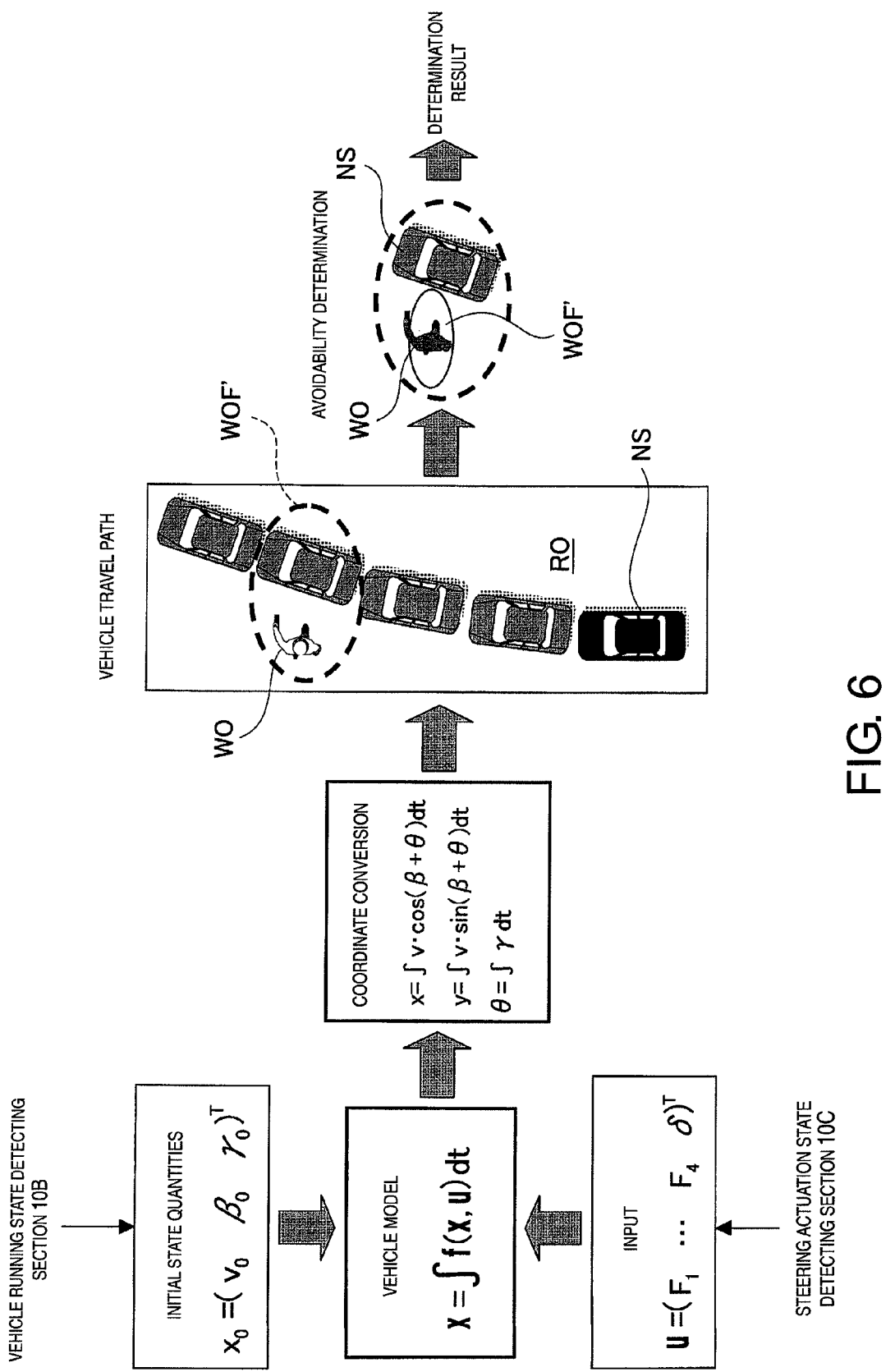
FIG. 6 is a schematic diagram illustrating the concepts involved in estimating the host vehicle travel path.
Figure 7:
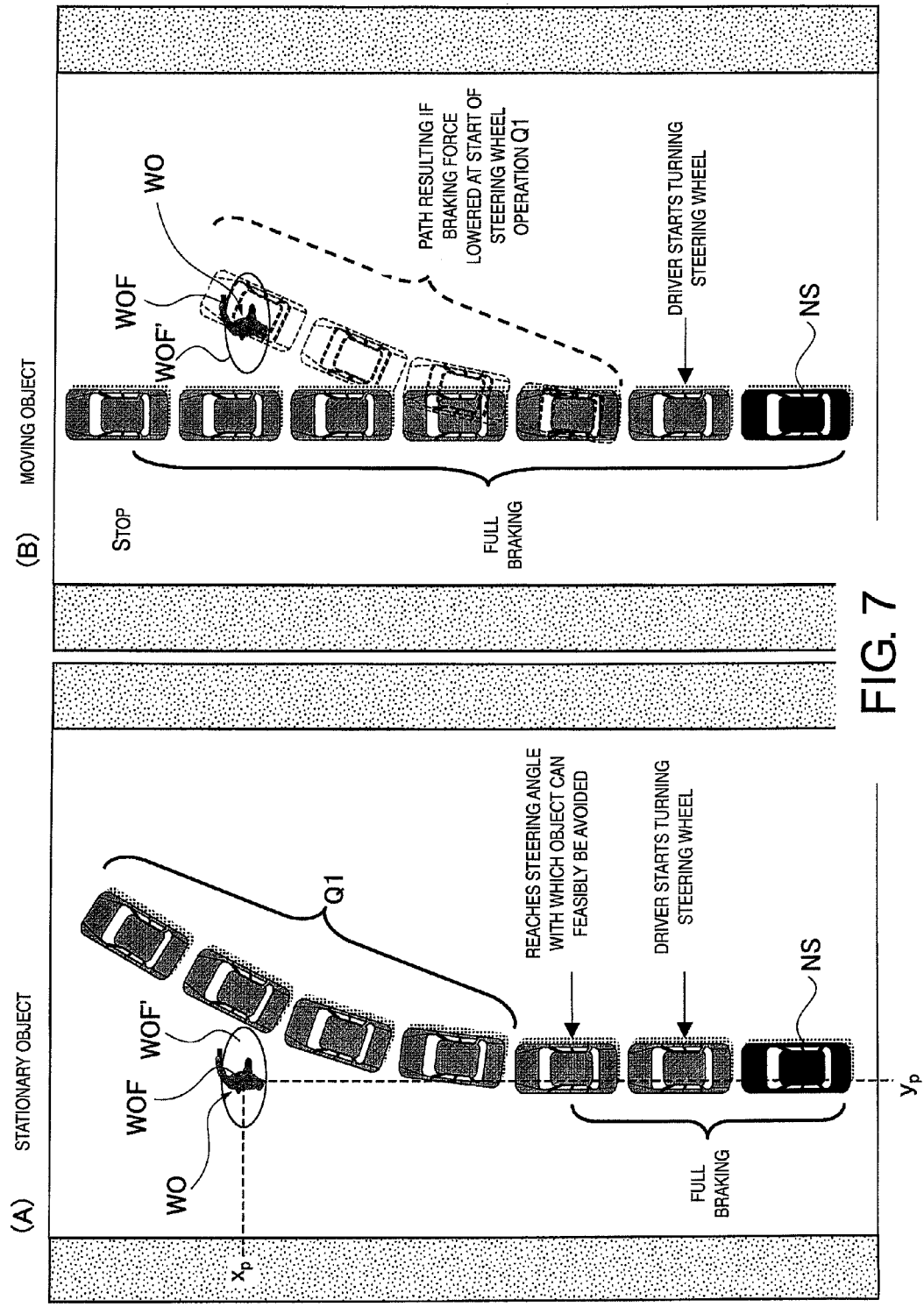
FIG. 7 is a pair of schematic diagrams illustrating the avoidance of an obstacle in which diagram (A) illustrates a situation in which the host vehicle avoids a stationary obstacle, and in which diagram (B) illustrates a situation in which the host vehicle avoids a moving obstacle.

The embodiment will now be explained further with reference to FIGS. 3 to 7. FIG. 3 shows a flowchart for explaining the steps of an object avoidability control. FIG. 4 shows the relationship between the preceding object WO and the host vehicle NS. FIG. 5 shows the running state of the host vehicle NS. FIG. 6 provides a visual illustration of the control flow when an obstacle is being avoided. FIG. 7 illustrates the state of an obstacle being avoided.

FIG. 4 illustrates a situation in which the host vehicle NS is traveling along a straight road RO and a pedestrian, i.e., an preceding object WO, starts to cross the road from the left side in front of the host vehicle NS. It is assumed that the preceding object WO has suddenly darted out onto the forward path of the host vehicle NS. Partitioning walls WA are provided on both sides of the straight road RO on which the host vehicle NS is traveling and, thus, it is physically impossible for the host vehicle NS to depart from either side of the road RO.

As shown in FIG. 3, the control unit 6 reads the detection signals from the cameras 1 and the sensors 2 to 5 once per prescribed cycle time and converts the signals into useful information for avoidance control calculations (Step 1). The images containing the forward road situation captured by the cameras 1 and the detection signals from the sensors 2 to 5 are stored in a memory region (not shown) of the control unit 6. The images captured by the cameras 1 contain the preceding object WO and the road boundaries ROR and ROL, which are useful external environment information for avoiding the preceding object. In order to use the images to calculate a control amount for avoiding the preceding object WO, the control unit 6 establishes a coordinate system for describing the motion of the host vehicle NS and the preceding object WO.

In Step 1, the control unit 6 detects the position of the preceding object with respect to the host vehicle and detects the running condition of the host vehicle, which will be used to establish the coordinate system. In this embodiment, as shown in FIG. 4, an X axis is set to extend along the forward movement direction of the straight road RO and a Y axis is set to intersect perpendicularly with the X axis. The origin O of the coordinate system can be selected arbitrarily. For example, it is possible to set the origin of the X axis at the current position of the center of gravity of the host vehicle NS and the origin of the Y axis in the vicinity of the longitudinal centerline (line demarking the widthwise center) of the straight road RO. Once an X-Y coordinate system is established, the positions of the host vehicle NS, the preceding object WO, and the road boundaries ROR and ROL can be expressed as coordinates in the coordinate system. The preceding object avoidance control will now be explained based on the assumption that the existence of the road boundaries ROR and ROL is not taken into account.

For example, the position of the host vehicle NS and the position of the preceding object WO at a point in time occurring t seconds after the current time are expressed as (x, y) and (xp, yp), respectively, in terms of the X and Y coordinates. In FIG. 4, the host vehicle NS is shown in the position where it is expected to be t seconds after the current time. The road boundaries ROR and ROL will not be taken into account in the following explanation.

The control unit 6 detects the preceding object WO by processing the stereo images captured by the cameras 1 and calculates the position of the preceding object WO. The relative positions of the host vehicle NS and the preceding object WO that have been calculated directly by the image processing are converted into values of the coordinate system and stored in a prescribed memory region. In this way, specific values are assigned to the variables (x, y) and (xp, yp).

Meanwhile, the control unit 6 executes the function of the braking force control determining section 6A. In other words, the control unit 6 determines if braking force control for the purpose of avoiding the preceding object WO is in progress (Step 2). The determination as to whether or not the braking force control is in progress is accomplished using a braking force control execution flag. The braking force control execution flag is "ON" when the braking force control is in progress and "OFF" when the braking force control is not being executed. Until a preceding object WO is discovered, the braking force control is not executed and the control unit 6 proceeds from Step 2 to Step 3. Thus, Step 2 serves as a braking force control determining section for determining whether or not braking force control is being executed against the vehicle.

In Step 3, the control unit 6 reads a control program for determining if braking force control should be started and executes the processing dictated by the control program. In this embodiment, it is determined that the conditions for starting the braking force control are satisfied when both of the inequality Equations (1) and (2) shown below are satisfied.

$$\frac{x_P - x}{v} \leq TTC_{min} \tag{1}$$

$$|y_P - y| \leq \frac{W_P + W_V}{2} \tag{2}$$

The expression on the left side of the Equation (1) is the value obtained by dividing the distance from the host vehicle NS to the preceding object WO by the vehicle speed v and represents the amount of time required for the host vehicle NS to arrive at the X-axis position where the preceding object WO exists starting from the current point in time. The expression $TTC_{min}$ on the right side is a positive valued parameter serving as a determination threshold value and is set to, for example, 3 to 4 seconds. Thus, if the host vehicle NS will reach the position of the preceding object WO within 3 to 4 seconds from the current time, there is the possibility that the host vehicle NS will contact the preceding object WO.

The left side of the Equation (2) expresses the distance between the host vehicle NS and the preceding object WO along the Y axis direction. Regarding the preceding object WO, a quasi-occupied region WOF' that is slightly larger than the region WOF actually occupied by the preceding object WO is taken into account by the right side of the Equation (2).

The right side of the Equation (2) is the value obtained by dividing the sum of the width $W_p$ of the quasi-occupied region WOF' and the width $W_v$ of the host vehicle NS by 2. If the distance from the host vehicle NS to the preceding object WO in the Y direction is equal to or smaller than the value ($W_p$+$W_v$)/2, then there is the possibility that the host vehicle NS will contact the preceding object WO if it continues to travel with the same running conditions. The reason the quasi-occupied region WOF' is taken into account is to increase the possibility of avoiding the preceding object WO.

In Step 4, the control unit 6 computes the inequality Equations (1) and (2) in order to determine whether or not it is impossible to avoid the preceding object WO based on the position of the preceding object WO with respect to the host vehicle NS and the running state of the host vehicle NS. If the conditions defined by the Equations (1) and (2) are both satisfied, then the control unit 6 determines that it is impossible to avoid the preceding object WO by braking alone and proceeds to Step 5. If at least one of the Equations (1) and (2) is not satisfied, then the control unit 6 proceeds to Step 13 and ends the braking force control start determination processing before repeating the control loop in the next control cycle. If the conditions defined by the Equations (1) and (2) are both satisfied, then the control unit 6 sets the braking force control execution flag to ON in Step 5 and sets target values for braking force control in Step 6. Thus, Step 4 serves as a first or initial preceding object avoidability determination section that is executed when a preceding object or obstacle is detected, and that determines whether or not the preceding object or obstacle is avoidable based on the relative position and relative velocity of the preceding object WO with respect to the host vehicle NS.

The braking force target values are set to the maximum braking force that can be generated by the host vehicle braking system 7. The maximum value of braking force that can be exerted at each of the wheels 8A' and 8B' will be indicated hereinafter as $Fi^{max}$. The letter "i" is an identifier to indicate which of the wheels 8A' and 8B' is being discussed. In this embodiment, "i" is an integer from 1 to 4.

The maximum braking force $Fi^{max}$ that can be exerted at each of the wheels 8A' and 8B' can be expressed as shown in the Equation (3).

$$F_i^{max} = \mu \cdot W_i \tag{3}$$

In the above Equation, term $\mu$ is the friction coefficient of the road surface and term $W_i$ is the weight load born by the respective wheel 8A', 8A', 8B' or 8B'. In this embodiment, the road surface friction coefficient $\mu$ is set in advance to a value that can be assumed to be typical for the kind of straight road RO on which the vehicle will travel. It is also possible to use a known technology to estimate the road surface friction coefficient $\mu$. The wheel loads $W_i$ can be estimated with good efficiency by using wheel load values obtained when the vehicle is at rest as reference values and revising the reference values using the measurement value obtained from the acceleration sensor 4.

The braking forces exerted by the host vehicle braking system 7 are exerted as braking torques. Therefore, the control target values calculated by the control unit 6 for each of the wheels 8A', 8A', 8B' and 8B' in Step 6 are calculated as braking torques $Ti^{com}$ to be applied by the host vehicle braking system 7.

The braking torques $Ti^{com}$ are calculated using the Equation (4) shown below.

$$T_i^{com} = \frac{F_i^{max}}{r} \tag{4}$$

In the above Equation, term r is the tire radius.

After the control unit 6 sends the control target values to the host vehicle braking system 7, it ends the processing of the current cycle of the control loop.

Thus, the control unit 6 determines if it is impossible to avoid the preceding object WO based on the position of the preceding object WO with respect to the host vehicle NS detected by the preceding object detecting section 10A and the host vehicle running condition detected by the running condition detection section 10B and, if it determines that avoiding the preceding object WO is impossible, then the control unit 6 starts executing braking force control. Then, after the prescribed cycle time has elapsed, the control unit 6 returns to Step 1 and reads the detection signals of the cameras 1 and the sensors 2 to 5.

In Step 2 of the next control cycle, the control unit 6 again determines if the braking force control is in progress. In this Step 2, if the braking force control execution flag was turned ON in the previous control cycle, then the control unit 6 determines that the braking force control is in progress and proceeds to Step 7.

In Step 7, the steering actuation state detecting section 10C detects whether or not the driver is performing a steering operation (i.e., turning the steering wheel) while the braking force control is in progress. If the driver is performing a steering operation, then the control unit 6 proceeds to Step 8. If the driver is not performing a steering operation, then the control unit 6 proceeds to Step 10 and continues with the current braking force control.

In Step 8, the control unit 6 reads a program for determining if the preceding object can be avoided and executes the program to determine if the preceding object WO can be avoided by steering and lowering the braking force currently acting on the host vehicle NS. The program is contrived to make the preceding object avoidability determination based on the position of the preceding object WO with respect to the host vehicle NS detected by the preceding object detecting section 10A, the host vehicle running condition detected by the running condition detection section 10B, and the actuation amount detected by the steering actuation state detecting section 10C.

In order to make this preceding object avoidability determination, the control unit 6 uses a series of vehicle motion model equations that define a vehicle motion model. The control unit 6 calculates the predicted vehicle travel path based on the vehicle motion model equations. An example of the vehicle motion model equations that can be used is shown below (U. Kiencke and L. Nielsen, "Automotive Control Systems," Springer Verlag, (2000)).

$$\dot{x}=f(x,u) \tag{5}$$

$$x=(v\ \beta\ \gamma)^T \tag{6}$$

$$u=(F_1 F_2 F_3 F_4\ \delta)^T \tag{7}$$

In the above Equations, term $\beta$ is the vehicle slip angle shown in FIG. 5, term $\gamma$ is the yaw rate, term $\delta$ is the front wheel steering angle, term f is a non-linear function describing the behavior of the vehicle, term u is an input vector, term x is an output vector, and term T is the transpose of the row or vector. Also, term $\theta$ is the yaw angle.

Assuming term t is a variable representing the time, the current time occurs at time $t=t_0$, and the initial value $x(t_0)=(v_0\ \beta_0\ \gamma_0)$ can be obtained for the output vector at the current time, a time series of the output vector x corresponding to any input vector u can be estimated by integrating the Equation (5). The initial value (speed) $v_0$ can be found using the detection output of the vehicle speed sensors 2 or the acceleration sensor 4. If the vehicle can be assumed to be traveling straight forward, the initial values $\beta_0$ and $\gamma_0$ can be set to 0.

If the host vehicle NS is not traveling in a straight line, then the slip angle $\beta$ is estimated using the yaw rate $\gamma$ measured by the yaw rate sensor 3, the vehicle speed v measured by the vehicle speed sensors 2, and the acceleration measured by the acceleration sensor 4. Any of various known technologies can be used as the method of estimating the slip angle $\beta$.

The input vector u is found using the Equation (8) shown below. Since this embodiment is contrived to find the vehicle travel path that will occur if the braking force control is cancelled, the braking force is treated as a quantity that changes in accordance with the differential Equations shown in the Equation (8) below, where $1/\omega_b$ is the response time constant of the hydraulic pressure control system 8C.

$$\dot{F}_i = -\omega_b \cdot F_i + \omega_b \cdot 0, F_i(t_0) = r \cdot T_i^{com} \tag{8}$$

It is assumed that the front wheel steering angle $\delta$ detected by the steering actuation state detecting section 10C at the current point in time remains constant.

Under the conditions described above, a state vector x(t) of the time series is calculated by integrating the differential Equation (5), which is a differential Equation of the output vector x with respect to the input vector u. The predicted travel path of the vehicle in the X-Y coordinate system can then be obtained by integrating the state vector x(t) of the time series using the differential Equations (9) to (11) shown below.

$$\dot{x}=v\cdot\cos(\beta+\theta) \tag{9}$$

$$\dot{y}=v\cdot\sin(\beta+\theta) \tag{10}$$

$$\dot{\theta}=\gamma \tag{11}$$

Based on the predicted travel path calculated, just described, the time $t_p(t=t_p)$ when the host vehicle NS will reach the X-axis position $x_p$ of the preceding object WO can be calculated. Assuming the host vehicle NS travels in accordance with the predicted travel path, the Equation (12) shown below expresses the condition that must be satisfied in order to avoid infringement of the host vehicle NS against the preceding object WO at the time $t_p$.

$$|y(t_P) - y_P| \geq \frac{W_P + W_V}{2} \tag{12}$$

In Step 9, if the condition expressed by the Equation (12) is satisfied, the control unit 6 determines that the preceding object WO can be avoided by cancelling the braking force control so long as the current steering angle is maintained. Meanwhile, if the condition expressed by the Equation (12) is not satisfied, the control unit 6 determines that it is not possible to avoid the preceding object WO.

In other words, as shown in the illustration of FIG. 6, the control unit 6 acquires the initial state quantity $x(t_0)=(v_0\ \beta_0\ \gamma_0)$ of the host vehicle NS based on the measurement values obtained from the running condition detection section 10B and the input vector $u=(F_1\ F_2\ F_3\ F_4\ \delta)$, which includes the steering angle $\delta$ obtained from the steering actuation state detecting section 10C. Then, the control unit 6 uses the acquired quantities in the vehicle motion modeling differential Equation (5) and applies a coordinate conversion to find the X and Y coordinates of the vehicle position and the direction 0 of the host vehicle NS with respect to the X axis in the manner of a time series. The control unit 6 then estimates the travel path of the host vehicle NS and determines if the preceding object WO can be avoided by determining if the condition expressed in the Equation (12) is satisfied. If the condition is satisfied, then the control unit 6 determines that the preceding object can be avoided if the current steering angle is maintained.

In Step 8, it is not necessary to integrate the differential Equation (5) in real time. The determination result can be obtained quickly by creating a map of determination results using an offline calculation.

Steps 8 and 9 (discussed later) serve as the preceding object avoidability determining section for determining if the preceding object WO can be avoided with the current steering angle and by lowering the braking force currently acting on the host vehicle NS. Steps 8 and 9 are executed when it is determined in the braking force control section (Step 2) that braking force control is in progress. The determination of the preceding object avoidability is made based on the position of the preceding object WO with respect to the host vehicle NS, the running state of the host vehicle NS, and the steering actuation amount or state. In other words, Steps 8 and 9 serves as a second preceding object avoidability determining section that is executed when the first avoidability determination (Step 4) finds that the obstacle is impossible to avoid and the steering wheel 5B is being turned, and that determines if the preceding object WO can be avoided by lowering a braking force currently being applied to the host vehicle NS.

If the preceding object WO is moving and the velocity $v_p$ is known, then the preceding object WO can be assumed to be undergoing linear motion at a constant speed and the Equation (13) shown below can be used instead of the Equation (12) to determine the preceding object avoidability in Step 9. The Equation (13) is obtained by substituting the term $y_p'(t_p)$ indicating the estimated position of the preceding object WO at the time $t_p$ for the term $y(t_p)$ in the Equation (13).

$$|y(t_P) - y_P'(t_P)| \geq \frac{W_P + W_V}{2} \quad (13)$$

The term $y_p'(t_p)$ can be calculated using the Equation (14) shown below.

$$y_p'(t_p) = y_p'(t_0) + v_p \times (t_p - t_0) \quad (14)$$

In the Equation above, term $y_p'(t_0)$ is the initial position of the preceding object WO at the time $t_0$ and $v_p \times (t_p - t_0)$ is the amount by which the preceding object WO moves during the period of time from $t_0$ to $t_p$ (i.e., $t_p - t_0$).

If it determines in Step 9 that the preceding object WO can be avoided, then the control unit 6 proceeds to Step 11 and turns the braking force control flag OFF. The control unit 6 then cancels the braking force control target value. The control unit 6 then proceeds to Step 13 and ends the control loop.

Steps 11 and 12 are braking force lowering steps serving to lower the braking force applied to the vehicle when it has been determined in the preceding object avoidability determining steps that the preceding object WO can be avoided.

If it determines in Step 9 that the preceding object WO can not be avoided, then the control unit 6 proceeds to Step 10 and ends the control loop while maintaining (holding) the braking force control target values.

Step 10 is a braking force maintaining step serving to keep the braking forces acting against the vehicle when it has been determined in Step 9, i.e., the preceding object avoidability determining step, that the preceding object can not be avoided.

The avoidability with respect to the preceding object WO can be determined using the Equations (13) and (14) regardless of whether the preceding object WO is moving or stationary.

Referring to FIG. 7, a situation will now be explained in which a preceding object WO is discovered as shown in FIG. 4 and the control unit 6 starts braking while the driver turns the steering wheel to the right (for example) to avoid the preceding object WO. A case in which the preceding object WO is stationary and a case in which the preceding object WO is moving will be explained separately.

Diagram (A) of FIG. 7 shows a case in which the preceding object WO is stationary. When the control unit 6 discovers the preceding object WO, it executes Steps 1 to 6 sequentially and puts the host vehicle NS into a fully braked state when the Equations (1) and (2) are satisfied.

Meanwhile, the driver operates the steering wheel in order to avoid the preceding object WO. The host vehicle NS enters the fully braked state when a prescribed amount of time has elapsed since the braking force control was started. During a period immediately after the driver starts turning the steering wheel, the host vehicle NS is held in the fully braked state because the steering wheel has not yet been turned to a steering angle with which the preceding object WO can feasibly be avoided. In the fully braked state, the tires of the host vehicle NS cannot exert lateral forces and, even if the steering wheel is turned, the host vehicle NS continues to move forward as it decelerates.

In the next control cycle, the control unit 6 determines in Step 2 that the braking force control of the host vehicle NS is in progress and proceeds to Step 7. In Step 7 the control unit 6 determines if the preceding object WO can be avoided by turning the steering wheel. In Steps 8 and 9, the control unit 6 determines if the driver has turned the steering wheel 5B by a steering amount (angle) that is large enough for the preceding object WO to feasibly be avoided. When it determines that the preceding object WO can be avoided, the control unit 6 cancels or lowers the braking of the host vehicle NS such that the tires can exert lateral forces. As a result, the host vehicle NS follows the travel path Q1 of diagram (A) of FIG. 7 and avoids the preceding object WO.

Diagram (B) of FIG. 7 shows a case in which the preceding object WO is moving from left to right relative to the host vehicle NS. When the control unit 6 discovers the preceding object WO, it executes Steps 1 to 6 sequentially and puts the host vehicle NS into a fully braked state when the Equations (1) and (12) are satisfied. Meanwhile, the driver operates the steering wheel in order to avoid the preceding object WO. The host vehicle NS enters the fully braked state when a prescribed amount of time has elapsed since the braking force control was started. During a period immediately after the driver starts turning the steering wheel, the host vehicle NS is held in the fully braked state because the steering wheel has not yet been turned to a steering amount or angle θ with which the preceding object WO can feasibly be avoided. In the fully braked state, the tires of the host vehicle NS cannot exert lateral forces and, even if the steering wheel 5B is turned, the host vehicle NS continues to move forward as it decelerates.

Then, the control unit 6 determines in Step 2 that the braking force control is in progress and proceeds to Step 8. After the control unit 6 executes the preceding object avoidability determination processing of Step 8, it proceeds to Step 9 and determines if the preceding object can be avoided.

In this case, if the Equation (2) is used when a steering angle θ with which the preceding object WO can feasibly be avoided is reached due to the driver turning the steering wheel rightward, then in Step 9 the control unit 6 will determine that the preceding object WO can be avoided. Then, the control unit 6 will cancel the braking control of the host vehicle NS and lower the braking force such that the tires exert lateral forces. As a result, the host vehicle NS will follow the travel path Q1 shown in diagram (B) of FIG. 7 and the likelihood that the host vehicle NS will infringe on the preceding object WO will increase.

However, when the preceding object WO is moving, the control unit 6 uses the Equations (12) and (14) in Step 9 to determine if the preceding object WO can be avoided by turning the steering wheel 5B. Thus, in a case in which the preceding object WO is moving, the control unit 6 determines that the preceding object WO cannot be avoided and proceeds to Step 10, where it maintains the braking force control such that the exertion of lateral tire forces is suppressed. As a result, the host vehicle NS follows the straight forward travel path Q2 while decelerating and stops immediately after passing the original position (xp, yp) of the preceding object WO. In this way, the control ensures an appropriate avoidance operation that accommodates the movement of the preceding object WO.

When the braking force control is maintained, the ABS control is executed as usual with respect to the rear wheels 8B' but is canceled with respect to the front wheels 8A'. Alternatively, instead of cancelling the ABS control, it is also acceptable to raise the slippage threshold value used to determine when to start the ABS control such that the ABS control does not start as readily. The purpose of maintaining (holding) the braking force control in this embodiment is to emphasize deceleration over lateral movement. During deceleration of the vehicle, the braking forces applied to the front wheels 8A' are larger than the braking forces applied to the rear wheels 8B'. If the braking forces applied to the front wheels 8A' are lowered by the ABS control, then the deceleration of the vehicle will be diminished and the control objective of the present invention will be lost. Therefore, preventing or reducing the action of the ABS control with respect to the front wheels 8A' is consistent with the objective of the present invention. Meanwhile, the braking forces applied to the rear wheels 8B' are more for the purpose of stabilizing the attitude of the host vehicle NS than for the purpose of decelerating the host vehicle NS. The stabilization of the vehicle attitude is a mandatory requirement in order to avoid incurring new dangers in addition to contact with the preceding object. Therefore, it is advantageous to execute normal ABS control with respect to the rear wheels 8B'.

The effects provided by the first embodiment will now be explained. When the condition expressed by the Equation (12) is satisfied, the control unit 6 determines that the preceding object WO can be avoided by cancelling the braking force control if the current steering angle is maintained. Conversely, when the condition expressed by the Equation (12) is not satisfied, the control unit 6 determines that the preceding object WO can not be avoided. Thus, by taking into account the running state of the host vehicle NS, the position of the preceding object WO with respect to the vehicle, and the steering actuation state (steering angle) imposed by the driver, the control unit 6 can determine if the braking forces being applied by the host vehicle braking system 7 will prevent the host vehicle NS from successfully avoiding the preceding object WO when, otherwise (if it were not for the braking forces), the preceding object WO could be avoided with the steering operation performed by the driver. Then, if it determines that the braking forces will prevent the host vehicle NS from avoiding the preceding object WO, the control unit 6 lowers the braking forces applied by the host vehicle braking system 7. In short, this embodiment enables the braking forces applied by the host vehicle braking system 7 to be reduced when the braking forces will impede the ability of the host vehicle NS to avoid an obstacle WO and improves the avoidability determination accuracy.

When the steering angle achieved by the driver is insufficient to avoid the preceding object WO or it is otherwise inappropriate to lower the braking forces, the control unit 6 maintains the braking forces applied by the host vehicle braking system 7 such that the vehicle can be decelerated. In this way, even if the preceding object can not be avoided, the speed at which the host vehicle NS approaches the preceding object WO can be reduced and the disadvantage resulting from the preceding object WO being unavoidable can be reduced.

Additionally, by into account taking the movement of the preceding object WO when determining the preceding object avoidability, the accuracy of the preceding object avoidability determination can be improved.

A highly accurate object avoidability determination can be accomplished because the steering wheel actuation angle (front wheel steering angle) is used to determine if the preceding object can be avoided.

Since the preceding object avoidability is determined by estimating the travel path of the host vehicle NS, the preceding object avoidability can be determined in a manner that more closely approaches the actual situation the host vehicle NS is facing.

Second Embodiment

Figure 8:
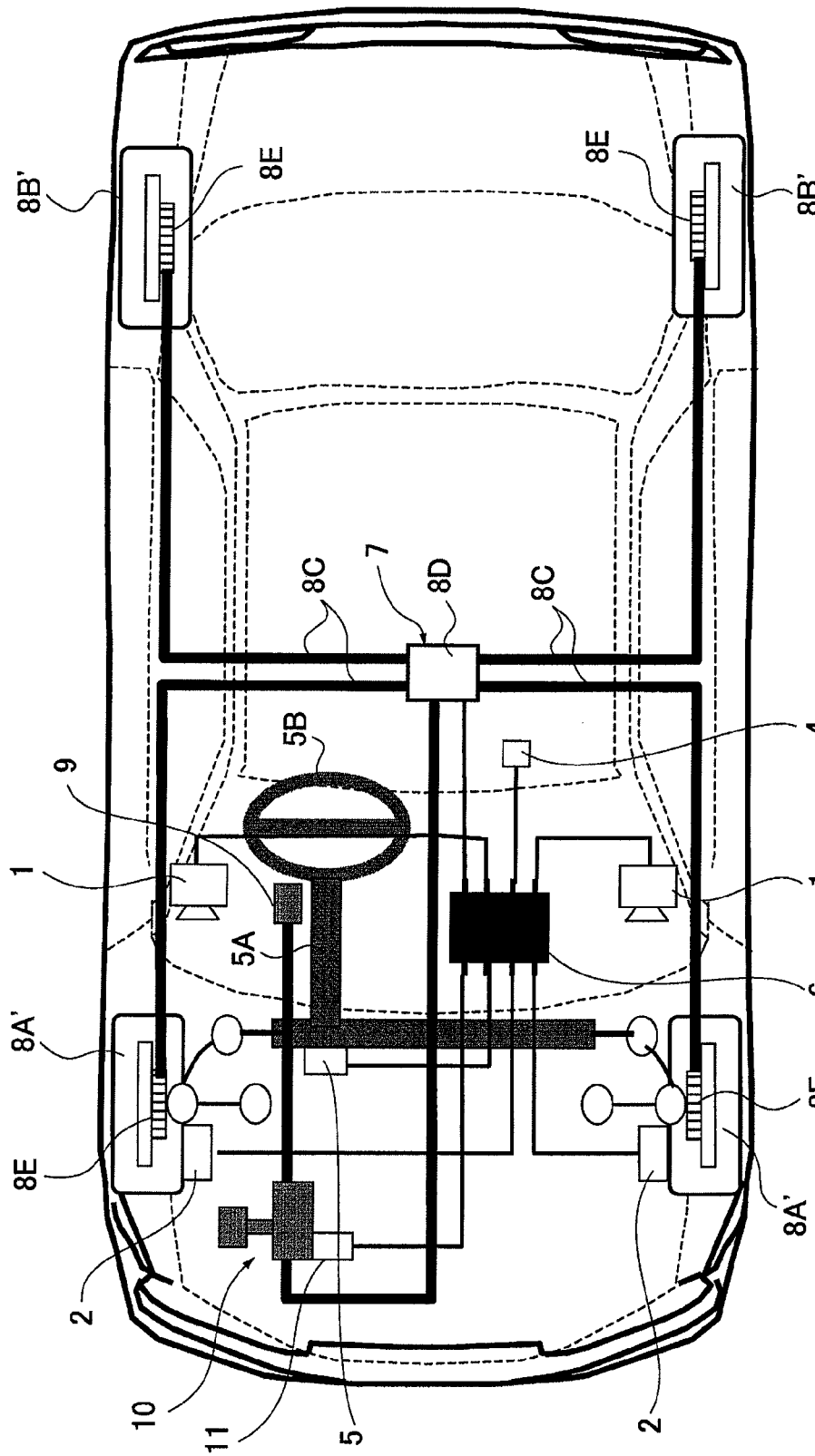
FIG. 8 is a vehicle is schematically illustrated with a vehicle brake control system in accordance with a second embodiment of the present invention.

Referring now to FIG. 8, a vehicle brake control system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In this embodiment, in addition to taking into account operation of the steering wheel, the vehicle brake control system takes into account a brake pedal actuation amount by the driver when determining whether or not to start braking force control. As shown FIG. 8, the vehicle brake control system includes a brake pedal 9 and a master cylinder 10. A pressure sensor 11 for measuring hydraulic pressure is provided in the master cylinder 10 such that operation of the brake pedal 9 by the driver can be measured based on the hydraulic pressure of the master cylinder 10.

The braking force control processing executed by the control unit 6 is basically the same as in the first embodiment, except that the braking force control start determination of Step 3 and the preceding object avoidability determination of Step 8 are different. Therefore, the processing executed in Step 3 and Step 8 will now be explained.

In addition to the conditions expressed by the Equations (1) and (2), in this embodiment the braking force control start determination of Step 3 also includes the condition expressed by the Equation (15) regarding operation of the brake pedal 9 by the driver.

$$P_{MS} \geq P_{ON} \quad (15)$$

In Equation (15), term $P_{MS}$ is the hydraulic pressure value measured by the pressure sensor 11 and term $P_{ON}$ is a threshold value. The threshold value $P_{ON}$ is used to determine if the driver has recognized an obstacle WO and adopted an avoidance behavior.

Braking force control is started when the conditions expressed by the Equations (1), (2), and (15) are all satisfied. Since the condition Equation (15) must be satisfied in order for the braking force control to be started, the braking force control does not start unless the driver is depressing the brake pedal 9 with a force equal to or larger than a prescribed depressing force. Thus, the start of the braking force control can be limited such that it occurs only when the driver has recognized the preceding object WO. As a result, the second embodiment offers the effect of preventing the occurrence of situations in which the driver experiences a feeling that there is something odd about the vehicle behavior due to the braking force control being started without regard for the intent of the driver.

Meanwhile, in order to determine if it is possible to avoid the preceding object WO, the second embodiment uses the Equation (16) shown below instead of the Equation (8).

$$\dot{F}_i = -\omega_b \cdot F_i + \omega_b \cdot F_b(p_{MS}), F_i(t_0) = r \cdot T_i^{com} \quad (16)$$

In the Equation (16), term $F_b(P_{MS})$ is the braking force generated when operation of the brake pedal 9 by the driver generates a pressure $P_{MS}$ in the master cylinder 10. In the second embodiment, the host vehicle braking system 7 acts in the direction of increasing the braking force generated due to operation of the brake pedal 9 by the driver. Therefore, even if the braking force control is canceled, the braking force resulting from operation of the brake pedal 9 by the driver will be maintained.

The effects provided by the second embodiment will now be explained. The control is contrived such that when the braking force control start determining section 6C determines that the preceding object WO cannot be avoided, the host vehicle braking system 7 is controlled to increase the braking force applied to the host vehicle NS. Consequently, in a situation in which the host vehicle NS encounters an obstacle WO and the driver is slow to recognize the preceding object WO, the braking force applied to the host vehicle NS can be increased and the speed at which the host vehicle NS approaches the preceding object WO can be reduced. This can be accomplished both in cases where the driver is not operating (turning) the steering wheel and cases where the driver is not turning the steering wheel enough to avoid the preceding object WO. Consequently, the disadvantage resulting from the preceding object WO being unavoidable can be further reduced.

Since the preceding object avoidability can be determined in a manner that takes into account the intent of the driver regarding avoiding the preceding object, i.e., operation of the brake pedal 9 by the driver, situations in which the execution of the braking force control causes the driver to experience a feeling that there is something odd about the vehicle behavior are less likely to occur.

Since the braking force is applied independently of the operation of the brake pedal 9 by the driver, the preceding object WO can be avoided regardless of the level of driving skill possessed by the driver.

Since the control unit 6 (braking force control execution command section) 6 executes the braking force control in the direction of increasing the braking forces resulting from operation of the brake pedal 9 by the driver, a braking force control that reflects the driver's intent to decelerate can be accomplished.

Even when the braking forces applied to the host vehicle NS are to be lowered, the travel path of the host vehicle NS is estimated based on the assumption that the braking forces applied as a result of the operation of the brake pedal 9 by the driver will be maintained. As a result, a braking force control that appropriately distributes the braking forces in view of the friction force that can be supported by each wheel can be accomplished while maintaining the braking forces resulting from operation of the brake pedal 9 by the driver.

Third Embodiment

Figure 9:
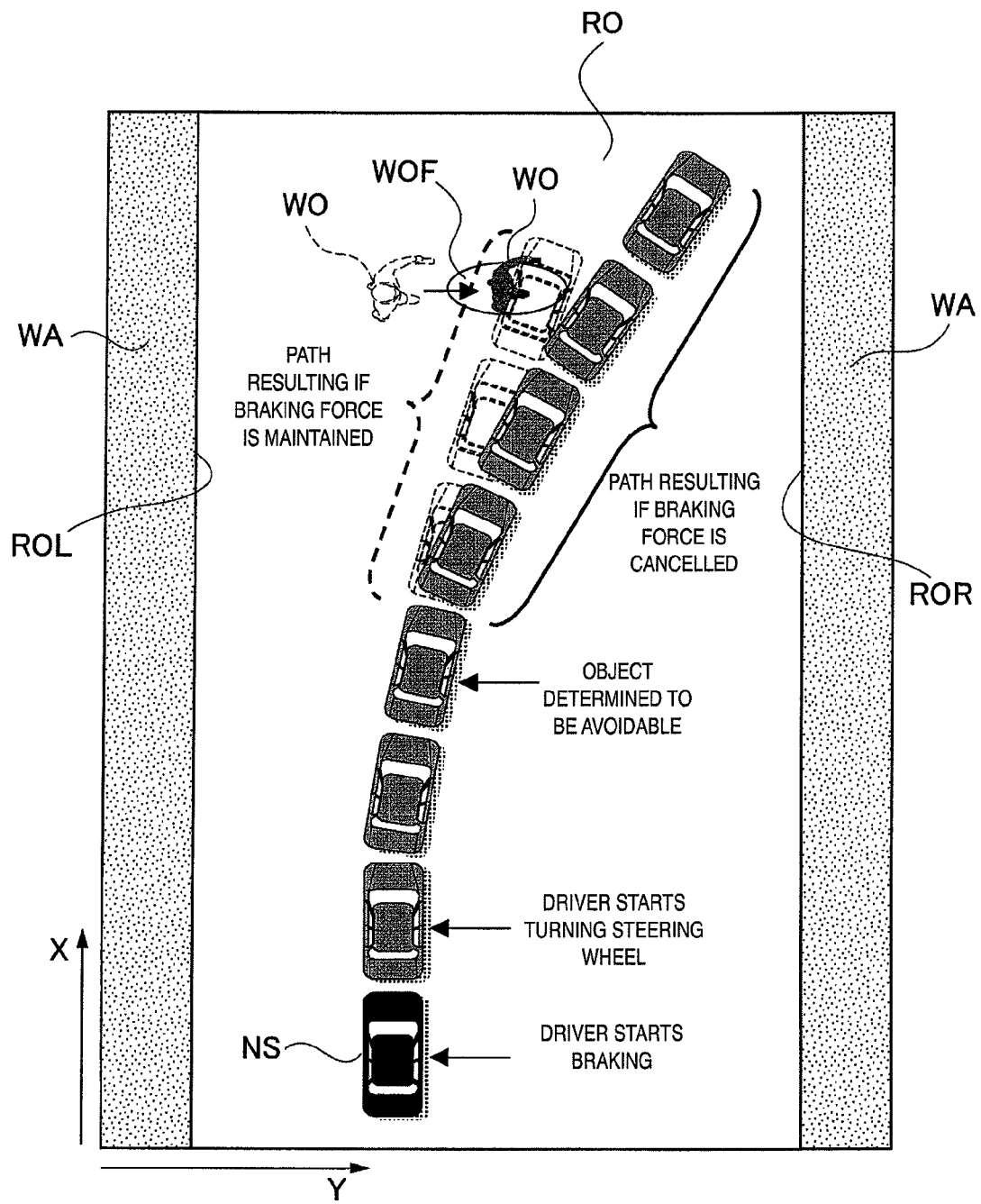
FIG. 9 is a schematic diagram illustrating a situation in which a vehicle brake control system in accordance with a third embodiment of the present invention.

Referring now to FIG. 9, a vehicle brake control system in accordance with a third embodiment will now be explained. In view of the similarity between the prior embodiments and this embodiments, the parts of this embodiment that are identical to the parts of the prior embodiments will be given the same reference numerals as the parts of the prior embodiments. Moreover, the descriptions of the parts of this embodiment that are identical to the parts of the prior embodiments may be omitted for the sake of brevity.

In particular, the third embodiment is similar to the second embodiment shown in FIG. 8 in that the braking force control is started when all of the condition Equations (1), (2), and (15) are satisfied. However, in the third embodiment, the braking forces generated due to operation of the brake pedal 9 by the driver are not increased when the braking force control start conditions are all satisfied. Furthermore, after the braking force control of the host vehicle NS has been started, if it determines that the operation of the steering wheel 5B by the driver is such that the preceding object WO can be avoided, then the control unit 6 cancels the braking forces without regard to operation of the brake pedal 9 by the driver and, thereby, avoids the preceding object WO. Thus, the braking force is applied independently of the operation of the brake pedal 9 by the driver, such that the preceding object WO can be avoided.

In the third embodiment, the braking force condition Equation (17) is used instead of the Equation (8) in Step 8 in order to calculate the predicted travel path of the host vehicle NS. Thus, the Equation (17) is used to determine the preceding object avoidability.

$$\dot{F}_i = -\omega_b \cdot F_i + \omega_b \cdot 0, \ F_i(t_0) = F_b(p_{MS}) \tag{17}$$

FIG. 9 depicts a situation in which the driver recognizes a preceding object WO and begins to depress the brake pedal 9. Realizing it will be difficult to avoid the preceding object by operating the brakes alone, the driver also begins to turn the steering wheel 5B rightward. If the braking forces continue to be applied to the host vehicle NS, then the friction forces of the tires will serve chiefly to support the braking forces and the tires will not be able to support the lateral forces required to avoid the preceding object WO by steering. Consequently, the vehicle will follow the path indicated with the broken line images and possibly contacting with the preceding object WO.

In the third embodiment, however, if it determines that the preceding object WO can be avoided, then the control unit 6 terminates the braking force control regardless of the operation of the brake pedal 9 by the driver and, thereby, increases the amount by which the host vehicle NS moves away from the preceding object WO in the Y direction. As a result, the preceding object WO can be avoided.

In the third embodiment, when the braking force applied to the vehicle is to be lowered, the predicted travel path of the host vehicle NS is estimated based on the assumption that a braking force is not applied to the host vehicle NS. As a result, the predicted travel path indicates the travel path that will result if the lateral forces that can be exerted by the wheels are maximized and an obstacle avoidance control that gives the top priority to avoiding the preceding object WO can be accomplished.

Fourth Embodiment

Referring now to FIGS. 10 to 13, a vehicle brake control system in accordance with a fourth embodiment will now be explained. In view of the similarity between the prior embodiments and this embodiments, the parts of this embodiment that are identical to the parts of the prior embodiments will be given the same reference numerals as the parts of the prior embodiments. Moreover, the descriptions of the parts of this embodiment that are identical to the parts of the prior embodiments may be omitted for the sake of brevity.

In the fourth embodiment, the constituent features of the vehicle brake control system are basically the same as in the first embodiment, i.e., as shown in FIG. 1. However, in this embodiment, the host vehicle braking system 7 is controlled such that both contact with the preceding object WO and contact with the road boundaries ROL and ROR are avoided. In the fourth embodiment, the cameras 1 are used for detecting the road boundaries ROL and ROR and the yaw angle θ of the host vehicle NS.

In the first embodiment, the determination as to whether or not the braking force control should be started and the determination as to whether or not the preceding object WO can be avoided are made based on the assumption that the steering angle δ resulting from operation of the steering wheel 5B remains constant during the period encompassed by the travel path estimate. Conversely, in the fourth embodiment, information regarding the angular velocity of the steering wheel 5B is used in addition to the steering angle such that future changes in the actuation amount of the steering wheel 5B can be predicted and taken into account when the preceding object avoidability is determined.

Figure 10:
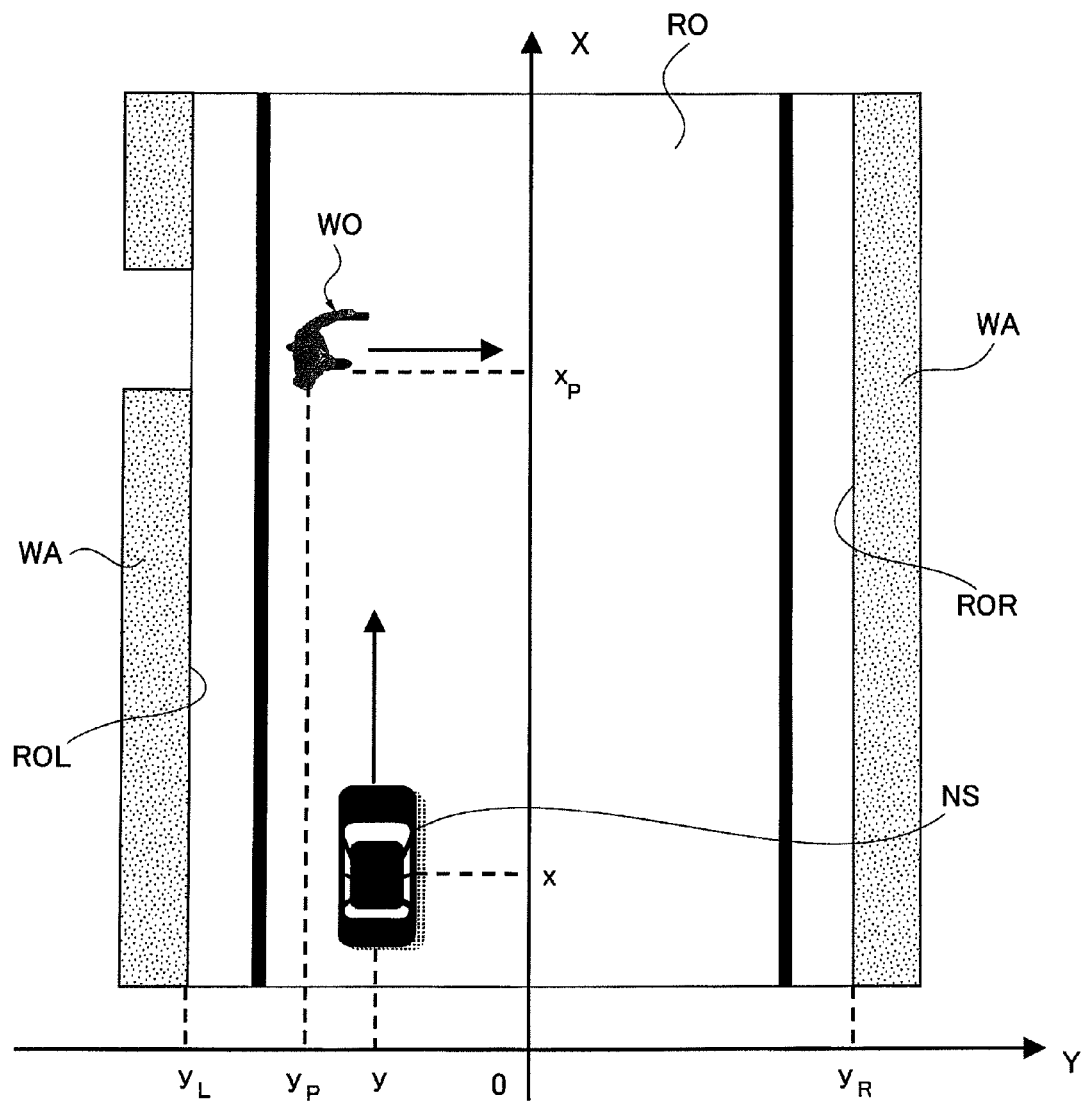
FIG. 10 is a schematic diagram illustrating a vehicle brake control system in accordance with a fourth embodiment of the present invention in which a coordinate system is established for defining the state quantities of the host vehicle.
Figure 11:
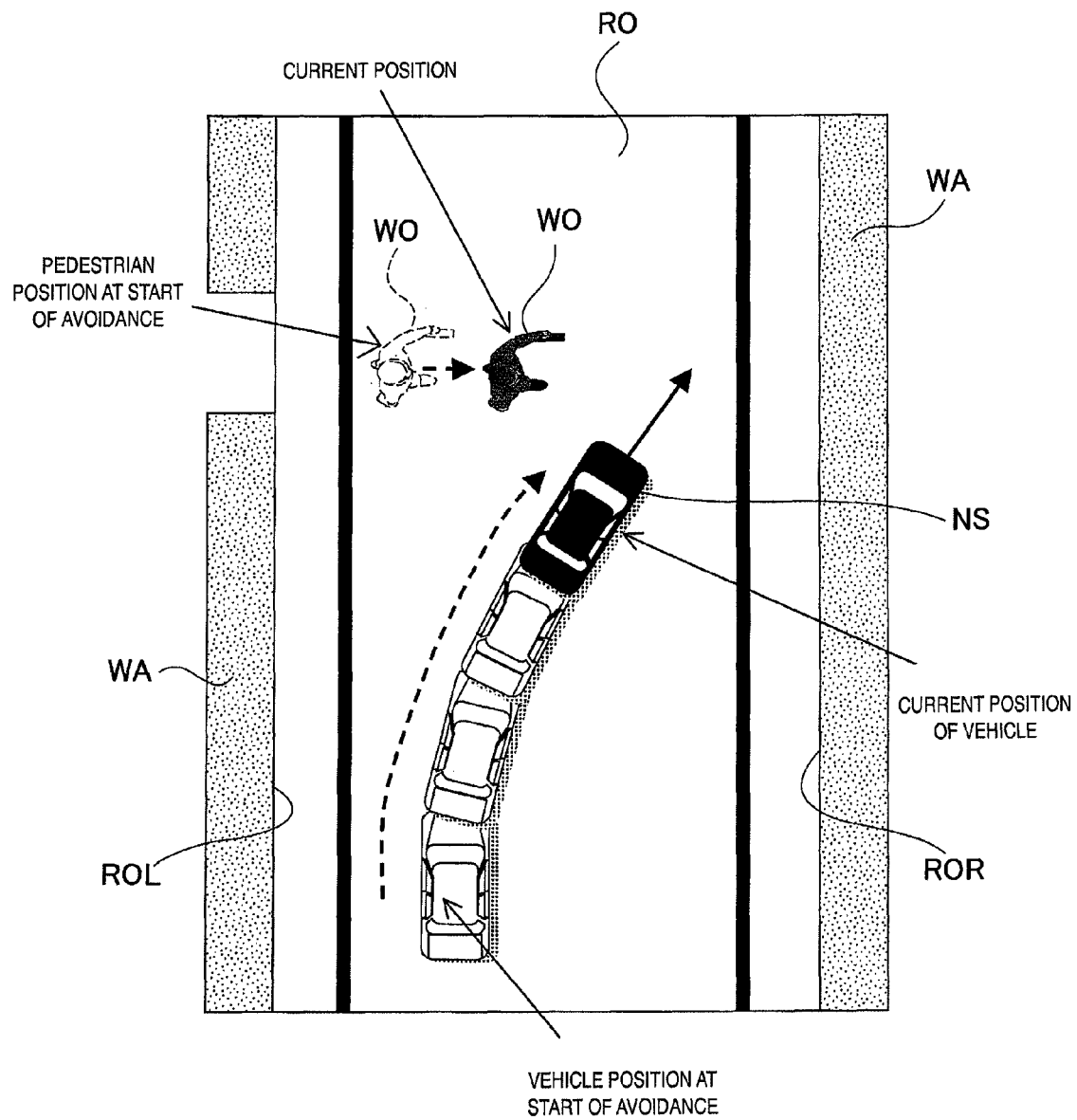
FIG. 11 is a schematic diagram illustrating a situation in which the vehicle brake control system in accordance with the fourth embodiment of the present invention is employed.

FIG. 10 illustrates a situation in which road boundaries ROL and ROR exist on both sides of the straight road RO and the preceding object WO is moving along the Y axis direction in front of the host vehicle NS. The X axis of the coordinate system is set similarly to the first embodiment, and the Y axis of the coordinate system is set such that the origin of the coordinate system is arranged at the widthwise middle of the road RO. As a result, the distance $y_p$ from the origin to the Y coordinate of obstacle WO, the distance y from the origin to the Y coordinate of the center of gravity of the host vehicle NS, the distance $y_L$ along the Y axis from the origin to the left road boundary ROL, and the distance $y_R$ along the Y axis from the origin to the right road boundary ROR can all be used as variables.

This embodiment anticipates a situation (illustrated in FIG. 11) in which the driver recognizes an preceding obstacle WO and starts turning the steering wheel 5B before the braking force control is started. The host vehicle NS avoids the preceding object WO but enters a state in which there is an increased chance that it will not be able to avoid the road boundary ROR.

The processing flow of the control unit 6 is basically the same as that of the first embodiment except for Step 3. The braking force start determination executed in Step 3 will now be explained.

In addition to using the preceding object avoidability condition Equations (1) and (2), the control unit 6 uses the road departure determination condition Equations (18) and (19) to execute the braking force start determination (i.e., determine if the braking force control should be started).

$$(y_R - y) \leq TTC_{min} \cdot v \cdot \sin(\beta + \theta) \quad (18)$$

$$(y - y_L) \leq TTC_{min} \cdot v \cdot \sin(\beta + \theta) \quad (19)$$

The Equation (18) is a condition Equation regarding the right-hand road boundary ROR and the Equation (19) is a condition Equation regarding the left-hand road boundary ROL. The braking force control is started when either one of the Equations (18) and (19) is satisfied.

After the braking force control is started, the functions expressed in the Equations (20) and (21) are used in Step 7 to determine the preceding object avoidability. The Equations (20) and (21) use the steering angle δ of the front wheels 8A' from the input vector u.

$$\delta(t) = sat(\delta(t_0) + \delta_V(t_0) \cdot (t - t_0)) \quad (20)$$

$$sat(\delta) = \begin{cases} \delta_{max} & \dots & \delta \geq \delta_{max} \\ \delta & \dots & -\delta_{max} \leq \delta \leq \delta_{max} \\ -\delta_{max} & \dots & \delta \leq -\delta_{max} \end{cases} \quad (21)$$

In the first embodiment, steering angle δ of the front wheels 8A' is a value obtained from the steering angle sensor 5 and is held fixed when determining the preceding object avoidability. In the fourth embodiment, it is assumed that the driver is turning the steering wheel 5B sharply and the angular velocity of the steering wheel 5B is taken into account in addition to the steering angle δ detected by the steering angle sensor 5. Thus, in the fourth embodiment, further steering angle input values are estimated.

In the Equations above, term $\delta_v$ is the steering angular velocity and $\delta_{max}$ is the maximum value of steering angle the driver is anticipated to reach.

Figure 12:
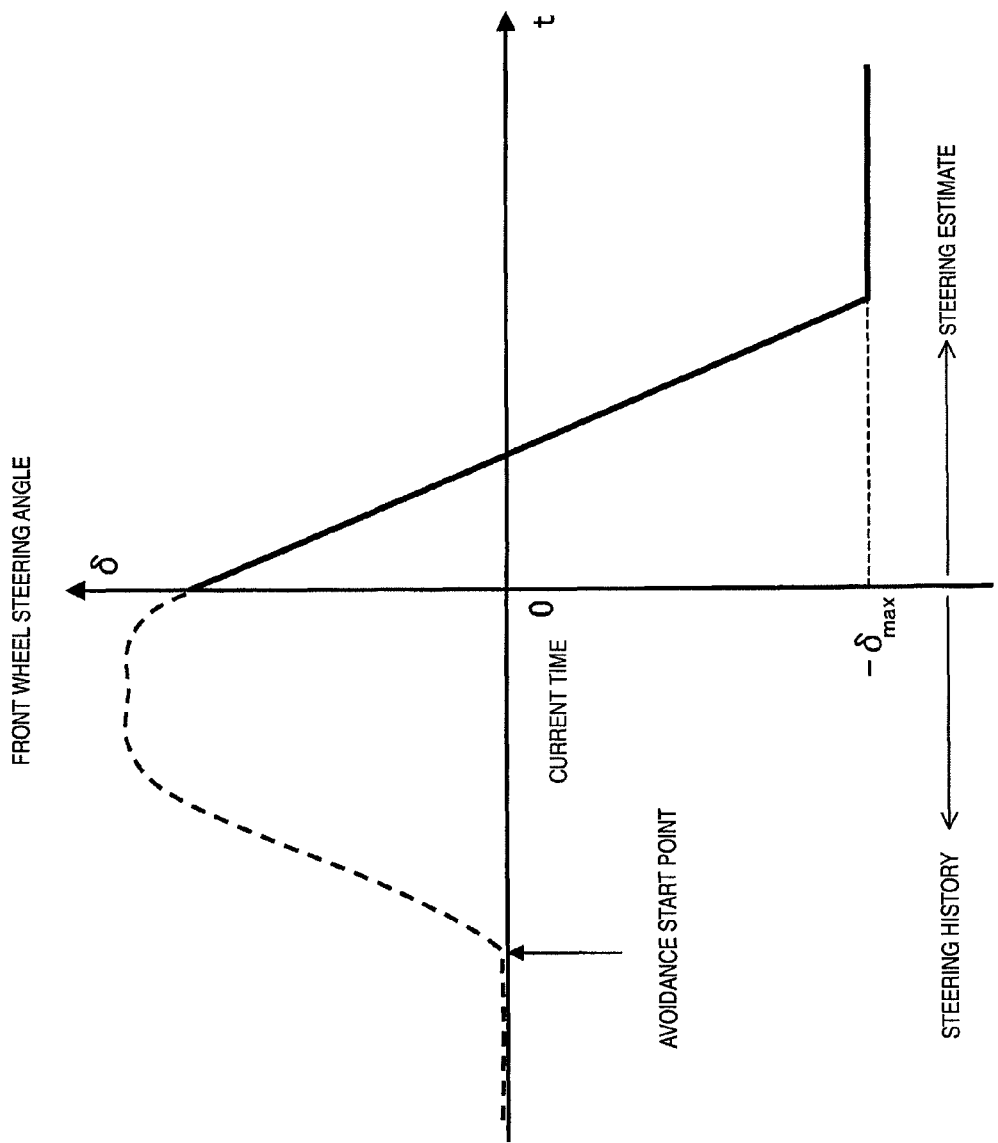
FIG. 12 is a graph illustrating an estimate of future steering angles calculated based on a driver steering estimating section in accordance with the fourth embodiment of the present invention.

When the functions are used to estimate future steering angles δ of the steering wheel 5B achieved by the driver based on the steering angular velocity, the steering angle can be estimated more accurately than when only the current steering angle δ is used, even when it is estimated that the driver will change the steering direction as shown in FIG. 12.

In FIG. 12, the point in time indicated as "Avoidance start point" is the point in time when the driver started turning the steering wheel 5B. The broken line portion of the curve ranging from the avoidance start point to the current time 0 indicates the steering history. The estimate values of the steering angles occurring after the current point in time are provided as a time series indicated with a solid line curve. The slope of the steering angle estimate values corresponding to times occurring after the current point in time is estimated based on the steering history occurring before the current point in time.

Figure 13:
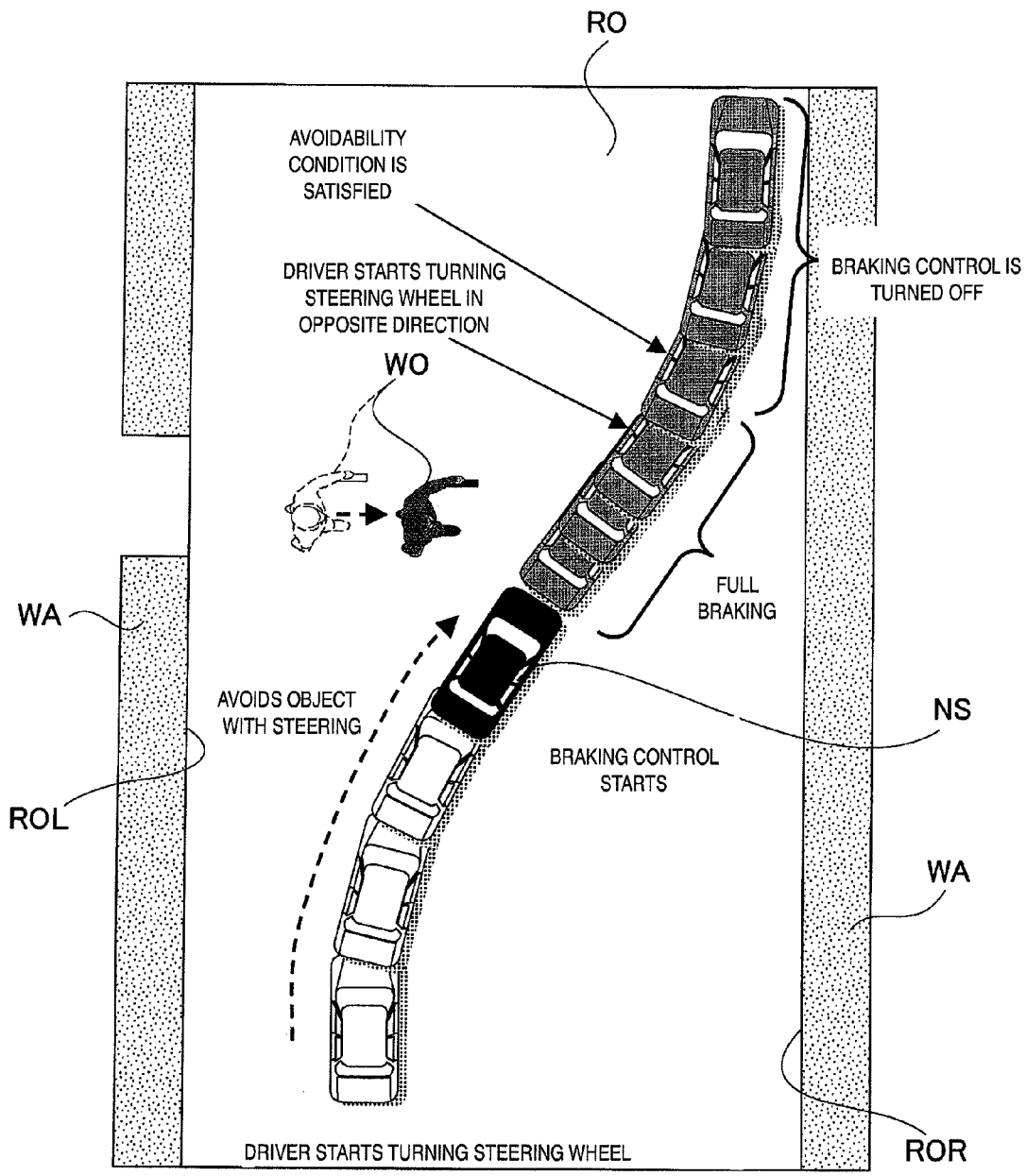
FIG. 13 is a schematic diagram illustrating an example of the host vehicle travel path that results when a preceding object is avoided using a steering estimation in accordance with the fourth embodiment of the present invention.

FIG. 13 shows the result of the control processing executed in the fourth embodiment. At the point in time when the driver recognizes the preceding object WO, the host vehicle NS is already in a state from which the driver can avoid the preceding object WO using steering alone by turning the steering wheel 5B to the right.

However, since the steering wheel 5B is turned sharply in order to avoid the preceding object WO, the host vehicle NS undergoes a large yaw angle θ and the possibility increases that the vehicle will not be able to avoid the right-hand road boundary ROR if the vehicle continues to advance in the same state.

In such a case, in Step 3, the control unit 6 computes the condition Equations (18) and (19), and in Step 4 the control unit 6 determines that the conditions for starting the braking force control have been satisfied and applies full braking to the host vehicle NS.

Meanwhile, the driver changes the steering direction of the steering wheel 5B from right to left. Since full braking is being applied to the host vehicle NS, the operation of the steering wheel 5B by the driver does not change the attitude of the host vehicle NS. Thus, as the host vehicle NS decelerates, it approaches the road boundary ROR while maintaining the same attitude.

At a point in time when the driver has turned the steering wheel 5B sharply, the braking force control is cancelled and, consequently, the attitude of the host vehicle NS changes just before the vehicle reaches the right-hand road boundary ROR. The host vehicle NS then stops due to deceleration as it assumes a frontward orientation. As a result, the vehicle successfully avoids both the preceding object WO and the road boundary ROR.

In the same situation, if the system were configured to simply reduce the braking forces when the steering wheel is turned, any braking force applied against the host vehicle NS by the braking force control would be reduced because the driver is turning the steering wheel 5B sharply. Consequently, it is very likely that the host vehicle NS would reach the road boundary ROR before the driver's leftward turning of the steering wheel could have any effect and the host vehicle NS would be unable to avoid the road boundary ROR. Conversely, with the fourth embodiment, both the preceding object WO and the road boundary ROR can be avoided.

With this embodiment, since the steering angle and the steering angular velocity are used to determine if the preceding object can be avoided, changes in the actuation state of the steering wheel 5B can be estimated. As a result, in a situation where an obstacle can be avoided by sharply reversing the turning direction of the steering wheel 5B, the braking forces applied by the braking force control can be lowered at an earlier timing and the preceding object avoidance effect of the system can be improved.

Furthermore, while an obstacle WO is being avoided, the system can detect road boundaries ROL and ROR and execute control to reduce the risk that the host vehicle NS will depart from the road.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with a vehicle brake control system of the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle brake control system comprising:
    a preceding object detecting section configured to detect a position of a preceding object existing in front of a host vehicle;
    a running condition detection section configured to detect a running condition of the host vehicle;
    a steering actuation state detecting section configured to detect an actuation state of a steering wheel of the host vehicle;
    a braking force detecting section configured to detect a current braking force applied to the host vehicle by a host vehicle braking system;
    a preceding object avoidability determining section configured to determine a possibility of avoiding the preceding object by steering and reducing the current braking force acting on the host vehicle based on the position of the preceding object, the running condition of the host vehicle, the braking force applied to the host vehicle and the steering wheel actuation state that are detected;
    a travel path estimating section configured to estimate a predicted travel path along which the host vehicle will travel based on the steering wheel actuation state and a prescribed braking force applied by the host vehicle braking system, the preceding object avoidability determining section being further configured to determine the possibility of avoiding the preceding object based on a positional relationship between the preceding object and the predicted travel path; and
    a braking force control section configured to reduce the current braking force applied by the host vehicle braking system when the preceding object avoidability determining section determines that the preceding object is avoided by steering and reducing the current braking force acting on the host vehicle.

2. The vehicle brake control system as recited in claim 1, wherein
    the braking force control section is configured to increase the current braking force applied by the host vehicle braking system when the preceding object avoidability determining section determines that the preceding object cannot be avoided by steering and reducing the current braking force acting on the host vehicle.

3. The vehicle brake control system as recited in claim 1, wherein
    the preceding object avoidability determining section is further configured to determine the possibility of the host vehicle avoiding the preceding obstacle based on a brake pedal actuation amount being equal to or larger than a prescribed value.

4. The vehicle brake control system as recited in claim 1, wherein
    the braking force control section is further configured to control the current braking force applied by the host vehicle braking system independently of a brake pedal actuation amount.

5. The vehicle brake control system as recited in claim 1, wherein
    the braking force control section is configured to increase the current braking force applied to the host vehicle to a larger value than a value corresponding to the brake pedal actuation amount.

6. The vehicle brake control system as recited in claim 1, wherein
  the travel path estimating section is further configured to estimate the predicted travel path with the prescribed braking force acting on the host vehicle being equal to a current brake pedal requested braking force generated by a brake pedal actuation amount, and
  the braking force control section is configured to prohibit increasing the current braking force if the preceding object avoidability determining section determines that the preceding object can be avoided.

7. The vehicle brake control system as recited in claim 1, wherein
  the travel path estimating section is configured to estimate the predicted travel path with the prescribed braking force acting on the host vehicle by the host vehicle braking system being equal to zero, and
  the braking force control section is configured to prohibit application of a braking force if the preceding object avoidability determining section determines that the preceding object can be avoided based on the predicted travel path.

8. The vehicle brake control system as recited in claim 1, further comprising
  a road boundary detecting section configured to detect a road boundary between a travel region in which travel is possible and a non-travel region in which travel is not possible on a road on which the host vehicle is traveling, and
  the preceding object avoidability determining section being further configured to determine the possibility of avoiding the preceding object by steering and reducing the current braking force with respect to the road boundary and the preceding object.

9. The vehicle brake control system as recited in claim 1, wherein
  the preceding object detecting section is further configured to detect a movement of the preceding object; and
  the preceding object avoidability determining section is further configured to determine the possibility of avoiding the preceding object by steering and reducing the current braking force based on the movement of the preceding object.

10. The vehicle brake control system as recited in claim 1, further comprising
  an initial preceding object avoidability determining section configured to determine a possibility of avoiding the preceding object by the current braking force acting on the host vehicle based on the position of the preceding object and a relative velocity of the host vehicle with respect to the preceding object.

11. A vehicle brake control method comprising:
  detecting a position of a preceding object existing in front of a host vehicle;
  detecting a running condition of the host vehicle;
  detecting an actuation state of a steering wheel of the host vehicle;
  detecting a braking force applied to the host vehicle by a host vehicle braking system;
  executing braking force control upon determining that the host vehicle cannot avoid the preceding object based on the position of the preceding object and the detected running condition of the host vehicle that are detected;
  determining if the preceding object can be avoided by steering and reducing the braking force currently acting on the host vehicle based on the position of the preceding object, the running condition of the host vehicle, the braking force applied to the host vehicle, and the steering wheel actuation state that are detected, upon determining that the host vehicle cannot avoid the preceding object;
  estimating a predicted travel path along which the host vehicle will travel based on the steering wheel actuation state and a prescribed braking force applied by the host vehicle braking system, with the determining if the preceding object is avoided including determining a possibility of avoiding the preceding object based on a positional relationship between the preceding object and the predicted travel path; and
  executing braking force control to reduce the braking force applied the host vehicle, upon determining that the preceding object is avoided by steering and reducing the braking force currently acting on the host vehicle.

12. The vehicle brake control system as recited in claim 1, wherein
  the braking force control section is configured to increase the current braking force applied by the host vehicle braking system when the preceding object avoidability determining section determines that the preceding object cannot be avoided by steering and reducing the current braking force acting on the host vehicle.

13. The vehicle brake control system as recited in claim 1, wherein
  the preceding object avoidability determining section is further configured to determine the possibility of the host vehicle avoiding the preceding obstacle based on a brake pedal actuation amount being equal to or larger than a prescribed value.

14. The vehicle brake control system as recited in claim 1, wherein
  the braking force control section is further configured to control the current braking force applied by the host vehicle braking system independently of a brake pedal actuation amount.

15. The vehicle brake control system as recited in claim 1, wherein
  the braking force control section is configured to increase the current braking force applied to the host vehicle to a larger value than a value corresponding to the brake pedal actuation amount.

16. The vehicle brake control method as recited in claim 11, wherein
  the estimating of the predicted travel path includes estimating the predicted travel path with the prescribed braking force acting on the host vehicle being equal to a current brake pedal requested braking force generated by a brake pedal actuation amount, and
  the executing of the braking force control includes prohibiting increasing the current braking force if the determining if the preceding object can be avoided results in a determination that the preceding object can be avoided.

* * * * *